US011870705B1

(12) United States Patent
Kantharajah et al.

(10) Patent No.: US 11,870,705 B1
(45) Date of Patent: Jan. 9, 2024

(54) DE-SCHEDULER FILTERING SYSTEM TO MINIMIZE SERVICE DISRUPTIONS WITHIN A NETWORK

(71) Applicant: Cisco Technology, Inc., San Jose, CA (US)

(72) Inventors: Roy Nidesh Kantharajah, La Crosse, WI (US); Wojciech Dec, Amsterdam (NL); Krishna Kumar Kuruvadi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/856,820

(22) Filed: Jul. 1, 2022

(51) Int. Cl.
*H04L 47/762* (2022.01)
*H04L 47/125* (2022.01)
*H04L 47/80* (2022.01)
*H04L 47/70* (2022.01)

(52) U.S. Cl.
CPC .......... *H04L 47/762* (2013.01); *H04L 47/125* (2013.01); *H04L 47/805* (2013.01); *H04L 47/822* (2013.01)

(58) Field of Classification Search
CPC ... H04L 47/762; H04L 47/125; H04L 47/805; H04L 47/822
See application file for complete search history.

(56) References Cited

U.S. PATENT DOCUMENTS

| | | | | |
|---|---|---|---|---|
| RE48,680 E | * | 8/2021 | Yemini | .................. G06Q 10/06 |
| 2018/0246751 A1 | * | 8/2018 | Dong | .................. G06F 9/45558 |
| 2018/0302299 A1 | | 10/2018 | Sun et al. | |
| 2020/0042364 A1 | | 2/2020 | Kumar Shimoga Manjunatha et al. | |
| 2020/0153898 A1 | * | 5/2020 | Sabath | .................. G06F 9/4856 |
| 2020/0183750 A1 | | 6/2020 | Abdelsalam et al. | |
| 2020/0287813 A1 | | 9/2020 | Kutch et al. | |
| 2021/0019196 A1 | | 1/2021 | Geffin et al. | |

(Continued)

FOREIGN PATENT DOCUMENTS

WO WO2021/156745 A1 8/2021

OTHER PUBLICATIONS

Marchese, et al., "Network-Aware Container Placement in Cloud-Edge Kubernetes Clusters", retrieved on Jul. 19, 2022, 2022 22nd IEEE International Symposium on Cluster, Cloud and Internet Computing, DOI: 10.1109/CCGRID54584.2022.00102, pp. 859-865.

(Continued)

*Primary Examiner* — Glenton B Burgess
*Assistant Examiner* — Jihad K Boustany
(74) *Attorney, Agent, or Firm* — Lee & Hayes P.C.

(57) ABSTRACT

This disclosure describes techniques and mechanisms for providing an intelligent de-scheduler filtering system that minimizes service disruptions within a network. The techniques may provide continuous monitoring of clusters within a dynamic system and provide an intelligent determination of pod(s) within a duster to move by utilizing a disruption score based on disruption policies, balancer policies, service level agreement policies, and other data associated with the cluster and/or pods. The techniques enable a subset of pods that are flagged as violating compute usage to be selected to be moved, such that the subset will result in the least disruption to move to help restore or realign compute resources in the system.

20 Claims, 6 Drawing Sheets

(56) References Cited

U.S. PATENT DOCUMENTS

2021/0216355 A1* 7/2021 Cortez .................. G06F 9/5088
2022/0045907 A1  2/2022 Szigeti et al.
2022/0214902 A1* 7/2022 Zhao ..................... G06F 9/4856

OTHER PUBLICATIONS

The PCT Search Report and Written Opinion dated Aug. 22, 2023 for PCT application No. PCT/US23/26574, 14 pgs.

* cited by examiner

DE-SCHEDULER FILTERING SYSTEM TO MINIMIZE SERVICE DISRUPTIONS WITHIN A NETWORK

TECHNICAL FIELD

The present disclosure relates generally to the field of computer networking, and more particularly to de-scheduling pods within a network.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of service networks, such as Local-Area Networks (LANs) that are in one physical location such as a building, Wide-Area. Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

In particular, clustering architectures may use schedulers in order to place pods and/or micro-services when a system is initiated. For instance, a Kubernetes scheduler may be utilized. When scheduling placement of pods and/or services, the scheduler's decisions may be influenced by its view of a particular cluster at the point in time when a new pod appears for scheduling. That is, the scheduler may place pods such that they are evenly distributed across nodes within a cluster, such that resources of the cluster are uniformly allocated at that point in time. However, clusters are dynamic, such that their states may change over time resulting in compute violations and/or availability violations. For instance, over time nodes within a duster may go down due to some fault, such that the resources available to each node may change.

Currently, there are de-schedulers that may identify pods and/or services that are candidates to be moved in order to reallocate resources. For instance, a pod and/or service may be a candidate where the pod and/or service is violating a compute policy and/or an availability policy. However, current solutions may identify service(s) and/or pod(s) that are critical to the operation of the system, such that de-scheduling the identified candidates may cause service disruptions. Moreover, current de-schedulers do not provide continuous monitoring of resource allocation within a system.

Accordingly, there is a need for the ability to move pod(s) and/or service(s) within a clustering architecture while minimizing service disruption to an end user. Moreover, there is a need to continuously monitor resource allocation within a clustering architecture.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

OVERVIEW

Figure 1:
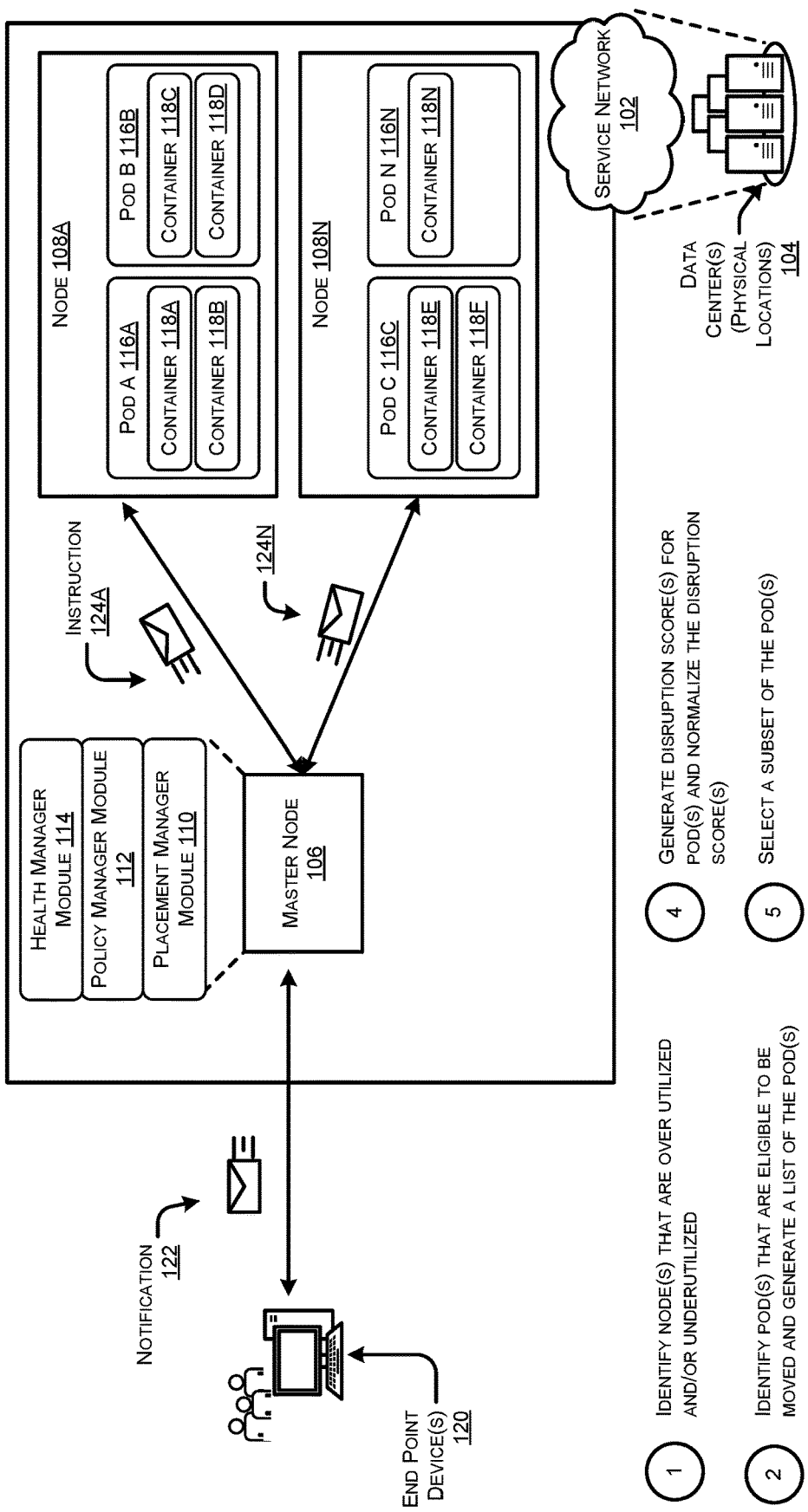
FIG. 1 illustrates a system-architecture diagram of an environment in which a system can perform intelligent de-scheduling to minimize service disruptions within a network.

The present disclosure relates generally to the field of computer networking, and more particularly to de-scheduling pods within a network.

A method to perform techniques for de-scheduling pods within a network are described herein and may include identifying one or more nodes within a cluster of nodes with resources that are at least one of underutilized or overutilized; identifying one or more pods associated with the duster of nodes that are eligible to be moved; generating a list comprising the one or more pods; generating one or more disruption scores for the one or more pods; determining, based at least in part on the one or more disruption scores, a subset of the one or more pods to move; and sending, to at least one of the one or more nodes within the cluster of nodes, an instruction to restart one or more services associated with the subset of the one or more pods.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of service networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

In particular, clustering architectures may use schedulers in order to place pods and/or micro-services when a system is initiated. For instance, a Kubernetes scheduler may be utilized. When scheduling placement of pods and/or services, the scheduler's decisions may be influenced by its view of a particular cluster at the point in time when a new pod appears for scheduling. That is, the scheduler may place pods such that they are evenly distributed across nodes within a cluster, such that resources of the cluster are uniformly allocated at that point in time. However, clusters are dynamic, such that their states may change over time resulting in compute violations and/or availability violations. For instance, over time nodes within a cluster may go down due to some fault, such that the resources available to each node may change.

Currently, there are de-schedulers that may identify pods and/or services that are candidates to be moved in order to reallocate resources. For instance, a pod and/or service may be a candidate where the pod and/or service is violating a compute policy and/or an availability policy. However, current solutions may identify service(s) and/or pod(s) that are critical to the operation of the system, such that de-scheduling the identified candidates may cause service disruptions. Moreover, current de-schedulers do not provide continuous monitoring of resource allocation within a system.

Accordingly, there is a need for the ability to move pod(s) and/or service(s) within a clustering architecture while minimizing service disruption to an end user, Moreover, there is a need to continuously monitor resource allocation within a clustering architecture.

This disclosure describes techniques and mechanisms for a system to continuously monitor resource allocation within a clustering architecture and provide an intelligent de-scheduler filtering system that minimizes service disruptions. In some examples, the system may identify one or more nodes within a cluster of nodes with resources that are at least one of underutilized or overutilized and/or identify one or more pods associated with the cluster of nodes that are eligible to be moved. The system may generate a list comprising the one or more pods and/or generating one or more disruption scores for the one or more pods. The system may determine, based at least in part on the one or more disruption scores, a subset of the one or more pods to move and send, to at least one of the one or more nodes within the cluster of nodes, an instruction to restart one or more services associated with the subset of the one or more pods.

In some examples, the system may comprise a placement manager module. In some examples, the placement manager module may be responsible for moving and/or placing pod(s), service(s), container(s), etc. For instance, the placement manager module may identify a set of pods to move in order to help alleviate any compute violation(s) and/or availability violation(s). In some examples, the placement manager module may identify the set of pod(s) to move based on determining that the set of pod(s) will minimize service level disruption(s) due to the move. In some examples, the placement manager module may cause one or more service(s) and/or node(s) to restart in order to move the pod(s).

In some examples, the placement manager module may comprise a violation detection module. In some examples, the violation detection module may identify one or more compute violation(s) and/or availability violation(s) within the network and/or cluster. In sonic examples, the violation detection module may comprise a de-scheduler. The de-scheduler may comprise an open source de-scheduler. For instance, the de-scheduler may correspond to Kubernetes open source de-scheduler and/or any other suitable de-scheduler. In some examples, the de-scheduler may be configured to detect compute resource violations. For instance, the compute resource violations may be detected compute resource violations) based on one or more policies (e.g., compute policies, availability policies, and/or any other suitable policy). In some examples, the violation detection module may identify and generate a list of pod(s) that are eligible to be moved. For instance, the list may identify at any point in time, a candidate list of pods that may need to be moved to help alleviate compute violation(s) within the duster and/or system.

In some examples, the placement manager module may comprise an intelligent disruption de-scheduler module. The intelligent disruption de-scheduler module may receive the candidate list as input. In some examples, the intelligent disruption de-scheduler module may receive one or more policies as input. For instance, the one or more policies may include disruption policies, SLA policies, and/or balancer policies. The intelligent disruption de-scheduler module may apply each of the disruption policies to each candidate pod within the candidate list and may generate a disruption score for each pod. The disruption score may indicate how disruptive moving a particular pod and/or service is for the system. The intelligent disruption de-scheduler may normalize each of the disruption scores and may sort each pod from least disruptive to most disruptive. The intelligent disruption de-scheduler module may select a subset of the sorted list of candidate pods to be moved. In some examples, the selected subset may be based on a balancer policy. The intelligent disruption de-scheduler may send instructions to one or more pods associated with the selected subset, where the instructions cause each pod in the subset to restart, thereby enabling the service(s) to be re-distributed within the cluster.

In some examples, the system may comprise a policy manager module. In some examples, the policy manager module is configured to manage one or more policies within the cluster. For instance, the one or more policies may comprise one or more violation policies (e.g., compute violation and/or availability violation), disruption policies, SLA policies, balancer policies, etc. In some examples, the policy manager module is configured to provide policies as input to the placement manager module. For instance, the policy manager module may provide one or more violation policies as input to the violation detection module of the placement manager module. In some examples, the policy manager module may provide one or more disruption policies, SLA policies, and/or balancer policies as input to the intelligent disruption de-scheduler module.

In some examples, the system may comprise a health manager module. In some examples, the health manager module is configured to communicate with the placement manager module and may provide insight into the service(s) within the cluster and/or a service that is offered and/or implemented as a pod. For instance, the health manager module may provide insight into a service level agreement (SLA) policy for a service to the placement manager module based on whether the service is a single instance or a multi-instance. In this example, the health manager module may input information into the violation detection module of the placement manager module, where the information may indicate whether the pod the service is running on is running a health instance of a service and/or service(s).

In this way, the system can intelligently identify a subset of pods from a list of candidate pods to move to (i) rebalance compute resources within a cluster and/or system and (ii) minimize service disruptions to an end user.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment in which a system 100 that can perform intelligent de-scheduling to minimize service disruptions within a network.

In some examples, the system 100 may include a service network 102 that includes devices housed or located in one or more data centers 104. The service network 102 may include one or more networks implemented by any viable communication technology, such as wired and/or wireless modalities and/or technologies. The service network 102 may include any combination of Personal Area Networks (PANs), Local Area Networks (LANs), Campus Area Networks (CANS), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The service network 102 may include devices, virtual resources, or other nodes that relay packets from one network segment to another by nodes in the computer network. The service network 102 may include multiple devices that utilize the network layer (and/or session layer, transport layer, etc.) in the OSI model for packet forwarding, and/or other layers.

The one or more data centers 104 may be physical facilities or buildings located across geographic areas that designated to store networked devices that are part of service network 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the packet-forwarding service networks 102 may not be located in explicitly defined data centers 104, but may be located in other locations or buildings.

The system 100 may comprise a clustering architecture that includes a master node 106 and one or more node(s) 108. In some examples, the master node 106 corresponds to a central node within the cluster. In some examples, the node(s) 108 may comprise worker nodes within the cluster that execute the service(s) and/or pod(s). While FIG. 1 illustrates a single cluster, it is understood that the system 100 may be implemented on a plurality of clusters.

As illustrated the master node 106 may include a placement manager module 110, a policy manager module 112, and/or a health manager module 114. In some examples, one or more of the placement manager module 110, policy manager module 112, and/or health manager module 114 may be implemented on one or more of the node(s) 108 within the cluster.

The placement manager module 110 may be responsible for moving and/or placing pod(s), service(s), container(s), etc. For instance, the placement manager module may identify a set of pods to move in order to help alleviate any compute violation(s) and/or availability violation(s). In some examples, the placement manager module may identify the set of pod(s) to move based on determining that the set of pod(s) will minimize service level disruption(s) due to the move. In some examples, the placement manager module may cause one or more services) and/or node(s) to restart in order to move the pod(s).

In some examples, the placement manager module may comprise a violation detection module. In some examples, the violation detection module may identify one or more compute violation(s) and/or availability violation(s) within the network and/or cluster. In some examples, the violation detection module may comprise a de-scheduler. The de-scheduler may comprise an open source de-scheduler. For instance, the de-scheduler may correspond to Kubernetes open source de-scheduler and/or any other suitable de-scheduler. In some examples, the de-scheduler may be configured to detect compute resource violations. For instance, the compute resource violations may be detected compute resource violation(s) based on one or more policies (e.g., compute policies, availability policies, and/or any other suitable policy). In some examples, the violation detection module may identify and generate a list of pod(s) that are eligible to be moved. For instance, the list may identify at any point in time, a candidate list of pods that may need to be moved to help alleviate compute violation(s) within the cluster and/or system.

In some examples, the placement manager module may comprise an intelligent disruption de-scheduler module. The intelligent disruption de-scheduler module may receive the candidate list as input. In some examples, the intelligent disruption de-scheduler module may receive one or more policies as input, For instance, the one or more policies may include disruption policies, SLA policies, and/or balancer policies. The intelligent disruption de-scheduler module may apply each of the disruption policies to each candidate pod within the candidate list and may generate a disruption score for each pod. The disruption score may indicate how disruptive moving a particular pod and/or service is for the system. The intelligent disruption de-scheduler may normalize each of the disruption scores and may sort each pod from least disruptive to most disruptive. The intelligent disruption de-scheduler module may select a subset of the sorted list of candidate pods to be moved. In some examples, the selected subset may be based on a balancer policy. The intelligent disruption de-scheduler may send instructions to one or more pods associated with the selected subset, where the instructions cause each pod in the subset to restart, thereby enabling the service(s) to be re-distributed within the cluster.

In some examples, the intelligent disruption de-scheduler may determine from the selected subset, an overall disruption impact of the operation to restore compute balance in the system. For instance, the intelligent disruption de-scheduler may, based on the overall impact, output a notification to an end user device 120 to warn the user of the move operation associated with restoring resource balance. In some examples, the system may comprise a configuration setting to determine if operation can happen automatically based on a customer risk tolerance set by the end user.

The policy manager module 112 may be configured to manage one or more policies within the cluster. For instance, the one or more policies may comprise one or more violation policies (e.g., compute violation and/or availability violation), disruption policies, service level agreement (SLA) policies, balancer policies, etc. In some examples, the policy manager module is configured to provide policies as input to the placement manager module. For instance, the policy manager module may provide one or more violation policies as input to the violation detection module of the placement manager module. In some examples, the policy manager module may provide one or more disruption policies, SLA policies, and/or balancer policies as input to the intelligent disruption de-scheduler module.

The health manager module 114 may be configured to communicate with the placement manager module and may provide insight into the service(s) within the cluster and/or a service that is offered and/or implemented as a pod. For instance, the health manager module may provide insight into a SLA policy for a service to the placement manager module based on whether the service is a single instance or a multi-instance. In this example, the health manager module may input information into the violation detection module of the placement manager module, where the information may indicate whether the pod the service is running on is running a health instance of a service and/or service(s).

As illustrated, the master node 106 may communicate with one or more end point device(s) 120. In some examples, the end point device(s) 120 may represent user device(s) that are accessing one or more service(s) provided by service network 102. In some examples, the master node 106 may determine from the selected subset, an overall disruption impact of the operation to restore compute balance in the system. For instance, the master node may, based on the overall impact, output a notification 122 to an end user device 120 to warn the user of the move operation associated with restoring resource balance. In some examples, the master node may comprise a configuration setting to determine if operation can happen automatically based on a customer risk tolerance set by the end user.

As illustrated, the master node may communicate with one or more node(s) 108. The node(s) 108 may comprise one or more pod(s) 116. In some examples, each pod 116 may represent one or more running process on a cluster. For instance, a pod may represent a unit of deployment (e.g., such as an instance of the application). In some examples, a pod may comprise on a single container or multiple containers 118. Each container may comprise one or more instances of a micro-service, code, etc. For instance, a container 118 may run an instance of a virtual machine.

At "1", the system may identify node(s) that are over utilized and/or under utilized. For instance, the placement manager module 110 may identify violations of one or more policies such as compute policies or availability policies. For instance, the violation may indicate that a particular node is over utilizing resources, thereby violating a compute policy and/or an availability policy. In some examples, the violation may indicate that a node is under utilized, such that the node is violating an availability policy. In some examples, the system continuously monitors resource allocation and utilization within the network and may detect at a point in time, whether resource allocation between nodes of a cluster are unbalanced.

At "2", the system may identify pod(s) that are eligible to be moved and may generate a list of the pod(s). For instance, the list may correspond to a candidate list of pod(s). In some examples, the list of candidate pod(s) may be identified using a de-scheduler, such as an open source de-scheduler (e.g., Kubernetes, or any other suitable de-scheduler). In some examples, the de-scheduler may be configured to detect compute resource violations. For instance, the compute resource violations may be detected compute resource violation(s) based on one or more policies (e.g., compute policies, availability policies, and/or any other suitable policy). In some examples, the violation detection module may identify and generate a list of pod(s) that are eligible to be moved. For instance, the list may identify at any point in time, a candidate list of pods that may need to be moved to help alleviate compute violation(s) within the cluster and/or system. In some examples, the list of candidate pod(s) identifies potential pod(s) to move to help rebalance computing resources. However, the list may not be based on determining an impact moving a pod will have on service disruption(s) to end user(s).

At "3", the system may apply one or more policies to each pod within the list. For instance, the one or more policies may include disruption policies, SLA policies, and/or balancer policies. The system may apply each of the disruption policies to each candidate pod within the candidate list.

At "4", the system may generate disruption score(s) for each of the pod(s) and normalize the disruption score(s). For instance, the disruption score may indicate how disruptive moving a particular pod and/or service is for the system. In some examples, the system may normalize each of the disruption scores to be between 0-100, where 0 indicates no disruption and 100 indicates the most disruption. The system may sort each pod in the candidate list from least disruptive to most disruptive based on the disruption score.

At "5", the system may select a subset of the pod(s) from the normalized list. In some examples, the selected subset may be based on a balancer policy. For instance, the balancer policy may indicate a number of pod(s) to be moved in order to rebalance and/or restore resources. In some examples, the balancer policy is configurable and may be changed by a network administrator and/or user of the system.

At "6", the system may send instruction(s) 124 to one or more node(s) to restart service(s) associated with the subset of the pod(s). For instance, the instructions 124 cause each pod in the subset to restart, thereby enabling the service(s) to be restored and/or realigned between nodes within the cluster. In some examples, the system may send a notification 122 to the end user device 120 as described above.

In this way, the system can provide continuous monitoring of clusters and resource usage within a dynamic system. Further, by utilizing configurable disruption policies, balancer policies, service level agreement policies, and other data associated with the cluster and/or pods, the techniques intelligently determine a subset of pod(s) within a cluster to move. Moreover, by selecting a subset of pods that are flagged as violating compute usage to be selected to be moved, the techniques result in improved user experience by minimizing service disruption to move to help restore or realign compute resources in the system.

Figure 2:
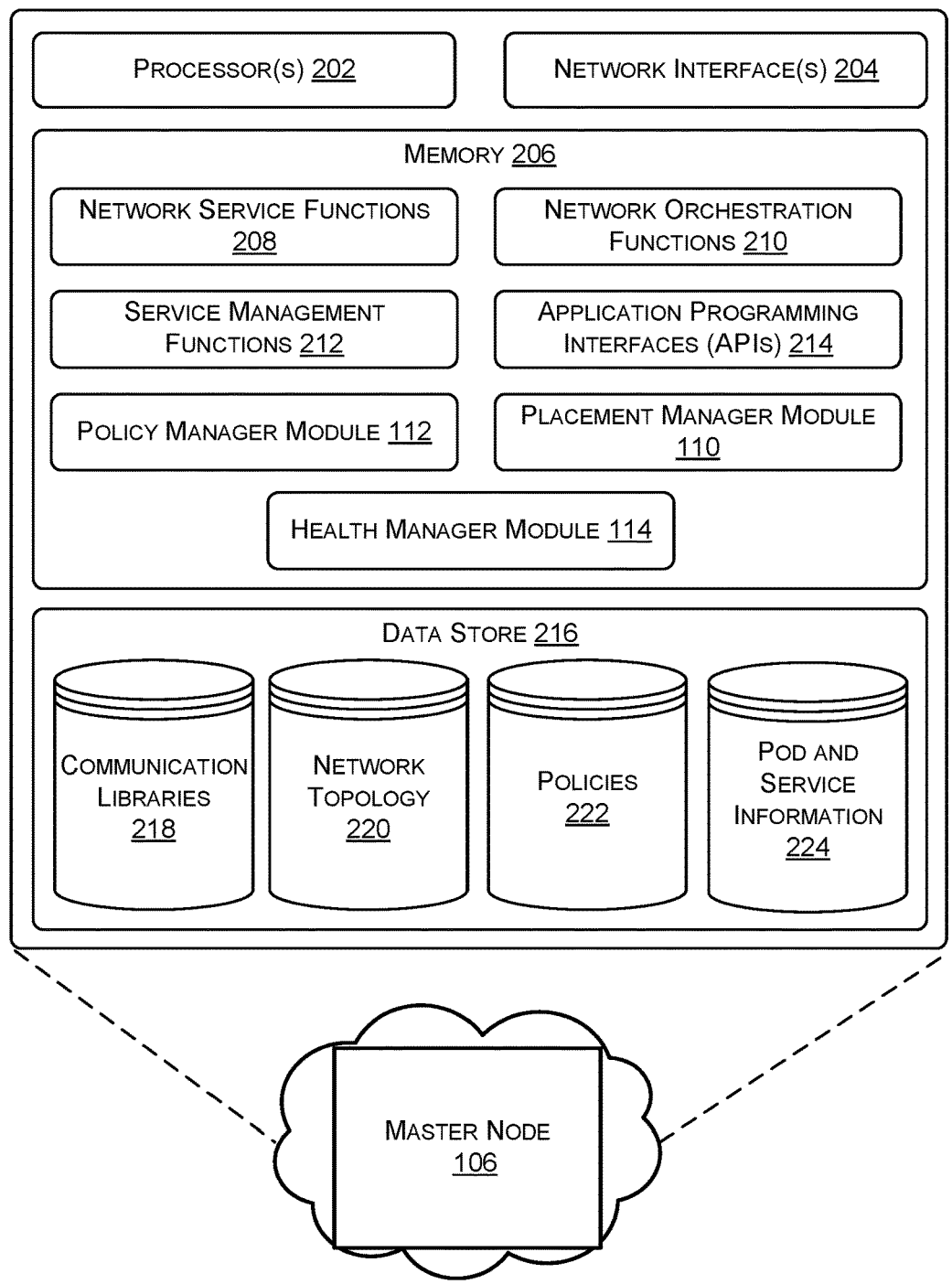
FIG. 2 illustrates a component diagram of an example master node described in FIG, I.

FIG. 2 illustrates a component diagram of an example master node 106 described in FIG. 1. In some instances, one or more components of the master node 106 may run on one or more nodes (e.g., such as node(s) 106) associated with the cluster, or associated with the service network 102. (e.g., a single device or a system of devices). The master node 106 may comprise a single controller that is running, or multiple instances of a network controller running at least partly at a same time.

Generally, the master node 106 may include a programmable controller that manages some or all of the control plane activities of the service network 102 and manages or monitors the network state using one or more centralized control models.

As illustrated, the master node 106 may include, or run on, one or more hardware processors 202 (processors), one or more devices, configured to execute one or more stored instructions. The processor(s) 202 may comprise one or more cores. Further, the master node 106 may include or be associated with (e.g., communicatively coupled to) one or more network interfaces 204 configured to provide communications with the device(s) 120 and other devices, and/or other systems or devices in the service network 102 and/or remote from the service network 102. The network interfaces 204 may include devices configured to couple to personal area networks (PANs), wired and wireless local area networks (LANs), wired and wireless wide area networks (WANs), and so forth. For example, the network interfaces 204 may include devices compatible with any networking protocol.

The master node 106 may also include memory 206, such as computer-readable media, that stores various executable components (e.g., software-based components, firmware-based components, etc.). The memory 206 may generally store components to implement functionality described herein as being performed by the master node 106. The memory 206 may store one or more network service functions 208, such as a slicing manager, a topology manager to manage a topology of the service network 102, a host tracker to track what network components are hosting which programs or software, a switch manager to manage switches of the service network 102, a process manager, and/or any other type of function performed by the master node 106.

The master node 106 may further include network orchestration functions 210 stored in memory 206 that perform various network functions, such as resource management, creating and managing network overlays, programmable APIs, provisioning or deploying applications, software, or code to hosts, and/or perform any other orchestration functions, Further, the memory 206 may store one or more service management functions 212 configured to manage the specific services of the service network 102 (configurable), and one or more APIs 214 for communicating with devices in the service network 102 and causing various control plane functions to occur.

Further, the master node 106 may include a placement manager module 110. As described above, the placement manager module 110 may be responsible for moving and/or placing pod(s), service(s), container(s), etc. For instance, the placement manager module may identify a set of pods to move in order to help alleviate any compute violation(s) and/or availability violation(s). In some examples, the placement manager module may identify the set of pod(s) to move based on determining that the set of pod(s) will minimize service level disruptions) due to the move. In some examples, the placement manager module may cause one or more services) and/or node(s) to restart in order to move the pod(s).

The master node 106 may include a policy manager module 112. As described above, the policy manager module 112 may be configured to manage one or more policies within the cluster, For instance, the one or more policies may comprise one or more violation policies (e.g., compute violation and/or availability violation), disruption policies, service level agreement (SLA) policies, balancer policies, etc. In some examples, the policy manager module is configured to provide policies as input to the placement manager module. For instance, the policy manager module may provide one or more violation policies as input to the violation detection module of the placement manager module. In some examples, the policy manager module may provide one or more disruption policies, SLA policies, and/or balancer policies as input to the intelligent disruption de-scheduler module.

Further the master node 106 may include a health manager module 114. As described above, the health manager module 114 may be configured to communicate with the placement manager module and may provide insight into the service(s) within the cluster and/or a service that is offered and/or implemented as a pod. For instance, the health manager module may provide insight into a SLA policy for a service to the placement manager module based on whether the service is a single instance or a multi-instance. In this example, the health manager module may input information into the violation detection module of the placement manager module, where the information may indicate whether the pod the service is running on is running a health instance of a service and/or service(s).

The master node 106 may further include a data store 216, such as long-term storage, that stores communication libraries 218 for the different communication protocols that the master node 106 is configured to use or perform. Additionally, the data store 216 may include network topology data 220, such as a model representing the layout of the network components in the service network 102 and/or data indicating available bandwidth, available CPU, delay between nodes, computing capacity, processor architecture, processor type(s), etc. The data store 216 may store policies 222 that includes compute policies, availability policies, disruption policies, SLA policies, and/or balancer policies configured for the network. Additionally, the data store 216 may include pod and service information 224, which may include pod characteristics, pod properties, pod health data, service data, etc.

Figure 3:
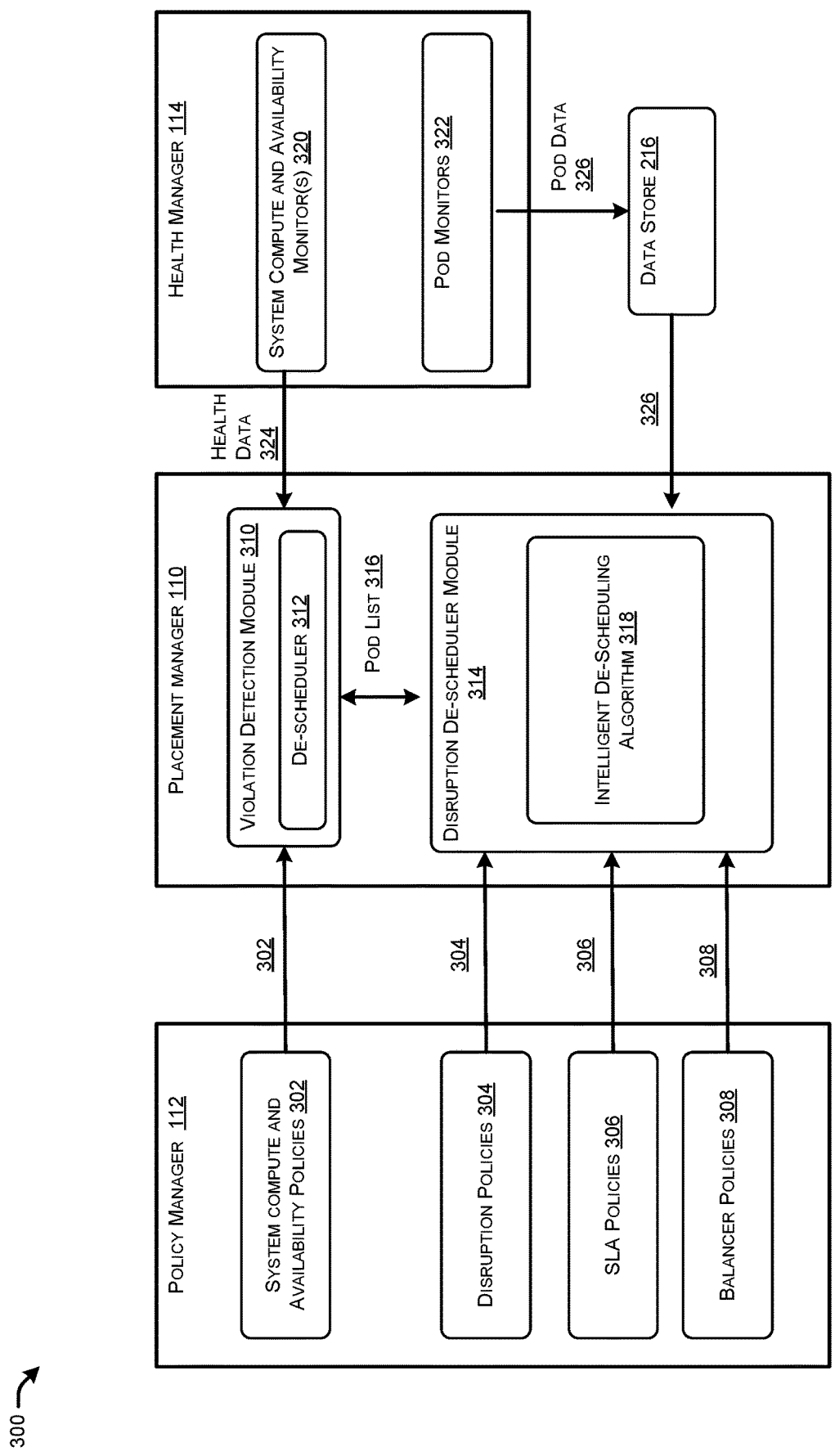
FIG. 3 illustrates a flow diagram of example input(s) and output(s) between components of the system 100 described in FIGS. 1 and 2.

FIG. 3 illustrates a flow diagram 300 of example input(s) and output(s) between components of the system 100 described in FIGS. 1 and 2. As illustrated in FIG. 3 and noted. above, the system may comprise a policy manager 112, placement manager 110, and health manager 114 as described above. The system may be implemented on a master node 106 and/or a node 108 described above. In some examples, the system may be implemented as a single instance application and/or a multi-instance application.

As illustrated, the policy manager 112 may comprise system compute and availability policies 302. Compute and availability policies may correspond to policies associated with distribution of resources within a cluster and may indicate when a node is being over utilized and/or under utilized. For instance, compute and availability policies may be associated with resource allocations associated with services. In some examples, compute and availability policies may define compute characteristics associated with a service and/or application (e.g., such as a virtual machine).

The policy manager 112 may comprise disruption policies 304. In some examples, the policy manager is configurable to define <n> disruption policies $P_1 \ldots P_n$ with associated weights $W_1 \ldots W_n$, where the sum of the weights equal 1. For example, the disruption policies may be configured as follows: $P_1$=pod is a leader, $W_1$=0.15; $P_2$=pod is singleton service, $W_2$=0.25; $P_3 \leq$pod is multi-instance service that has active/standby with active role, $W_3$=0.15; $P_4$=service level uptime agreement with customer, $W_4$=0.20; $P_5$=is pod a critical infrastructure service, $W_5$=0.25. As noted above, the disruption policies are configurable by a user of the system, such that any number of disruption policies may be defined for a particular cluster.

The policy manager 112 may comprise SLA policies 306 and/or balancer policies 308. As noted above, SLA policies may be configured to set a standard of performance within the network. For instance, an SLA policy may correspond to a measure of time associated with responding and resolving disruptions within the network. A balancer policy 308 may define a number of pod(s) to move at any given time. In some examples, the balancer policy 308 may be applied as a filter on the normalized list of candidate pods. SLA policies 306 and/or balancer policies 308 may be configurable by a network administrator or user of the network.

As illustrated the health manager 114 may comprise system compute and availability monitor(s) 320 and pod monitor(s) 322. In some examples, system compute and availability monitor(s) 320 and/or pod monitor(s) 322 may continuously monitor the system and/or pod(s) of the cluster. The system compute and availability monitors 320 may be configured to provide insight into the service(s) that are offered and/or implemented at a particular pod. For instance, the system compute and availability monitors 320 may monitor the service(s) offered within a cluster and/or system and may track information associated with the service(s) such as resource usage, health of a service, characteristics associated with the service (e.g., such as single instance, multi-instance, etc.), or any other suitable information. The pod monitors 322 may be configured to track information associated with each pod within the cluster and/or system. For instance, the pod monitors may track pod data 326 (e.g., such as pod characteristics and/or key metrics associated with each pod, such as leadership status, replica counts, etc.) and may store the pod data 326 in the data store 216.

As illustrated, the placement manager 110 may comprise a violation detection module 310 and a disruption de-scheduler module 314. In some examples, the violation detection module 310 may identify one or more compute violation(s) and/or availability violation(s) within the network and/or cluster. In some examples, the violation detection module 310 may comprise a de-scheduler 312. The de-scheduler 312 may comprise an open source de-scheduler. For instance, the de-scheduler may correspond to Kubernetes open source de-scheduler and/or any other suitable de-scheduler. In some examples, the de-scheduler 312 may be configured to detect compute resource violations. For instance, the compute resource violations may be detected based on one or more policies (e.g., compute and availability policies 302, and/or any other suitable policy). As illustrated in FIG. 3, the violation detection module may receive system compute and availability policies 302 as input from the policy manager 112. Additionally or alternatively, the violation detection module 310 may receive health data 324 as input from the health manager 114. In some examples, the health data may, indicate whether a pod is running a health instance of a service and/or service(s).

In some examples, the violation detection module 310 may identify and generate a list of pod(s) 316 that are eligible to be moved. For instance, the list may identify at any point in time, a candidate list of pods 316 that may need to be moved to help alleviate compute violation(s) within the cluster and/or system. In some examples, the list of pods 316 may be based at least in part on the system compute and availability policies 302 and/or health data 324.

As described above, the disruption de-scheduler module 314 may receive the pod. list 316 as input. In some examples, the disruption de-scheduler module 314 may receive one or more policies as input from the policy manager 112. For instance, the one or more policies may include disruption policies 304, SLA policies 306, and/or balancer policies 308. As illustrated in FIG. 3, the disruption de-scheduler module 314 may also receive input from the data store 216. For instance, the disruption de-scheduler module 314 may receive pod data 326 (e.g., information associated with pod characteristics and/or key metrics of a pod, such as leadership status, replica counts, etc.). .As described in greater detail below with regard to FIG. 4, the disruption de-scheduler module 314 may apply then perform an intelligent de-scheduling algorithm 318 in order to determine disruption scores and select a subset of the pod(s) in the pod list 316 to move. In some examples, the intelligent de-scheduling algorithm 318 may use the one or more policies and/or pod data 326 when determining the subset of the pod(s).

Figure 4:
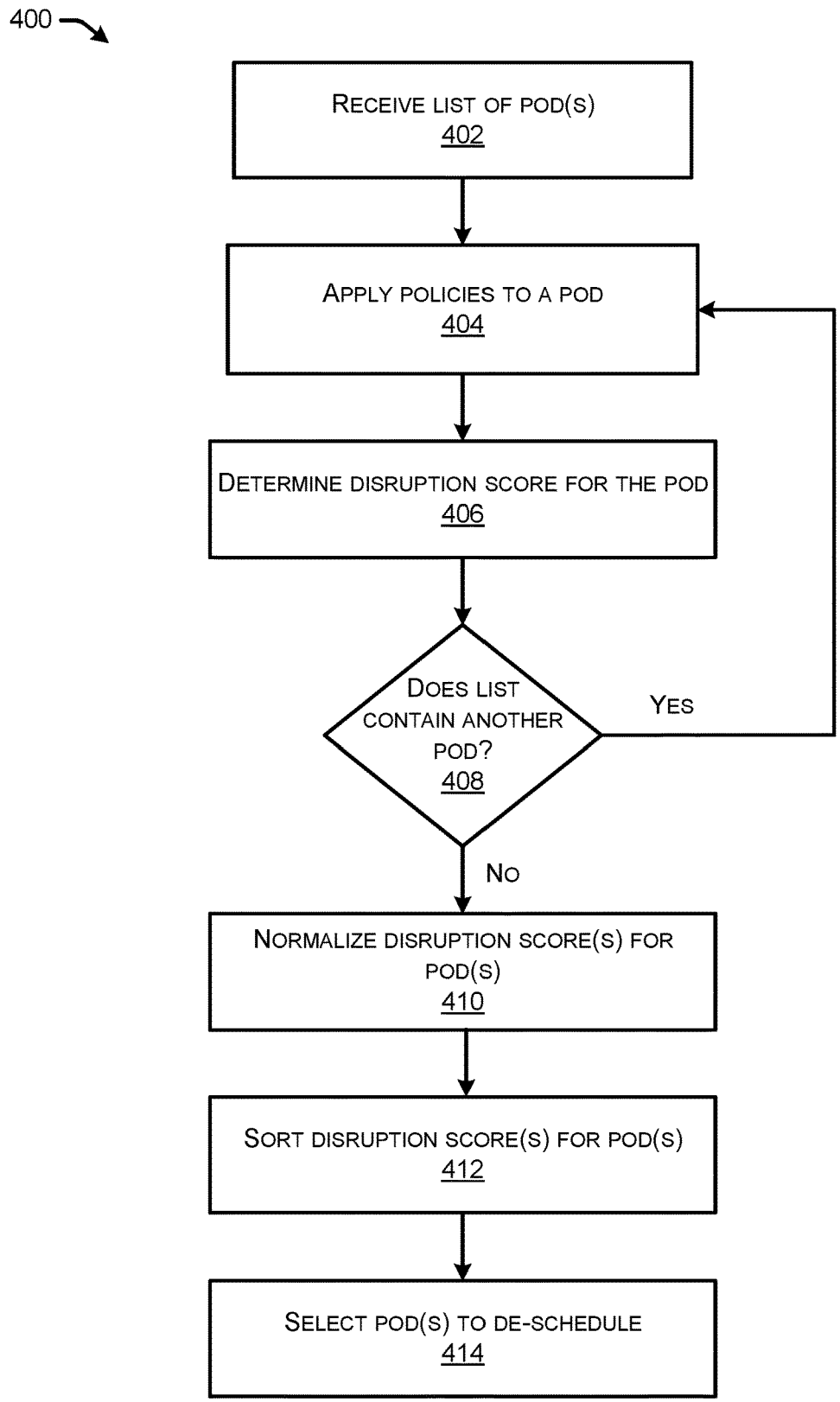
FIG. 4 illustrates a flow diagram of an example system associated with a de-scheduler algorithm for determining a subset of pod(s) to move in order to realign and/or restore resources within a network.

FIG. 4 illustrates a flow diagram of an example system 400 associated with de-scheduler algorithm 318 for determining a subset of pod(s) to move in order to realign and/or restore resources within a network. In some instances, the steps of the system 400 may be performed by system 100 and/or one or more devices (e.g., master node 106, node 108, placement manager module 110, etc.) that include one or more processors and one or more non-transitory computer-readable media storing computer-executable instructions that, when executed by the one or more processors, cause the one or more processors to perform operations of the system 400, For instance, the system 400 may be performed by the de-scheduler algorithm 318 noted in FIG. 3 above.

At 402, the system may receive a list of pod(s). For instance, the list of pod(s) may correspond to the list of pod(s) 316 described above.

At 404, the system may apply policies to a pod. For instance, the disruption de-scheduler module 314 may apply each of the disruption policies 304 to each candidate pod within the pod list 316. As noted above, the disruption policies 304 may be applied based at least in part on the pod data 326 received from the health manager 114.

At 406, the system may determine a disruption score for the pod. For instance, as described above, the disruption de-scheduler module 314 may determine the disruption score using the following formula: $DS = P_1W_1 + P_2W_2 + \ldots P_nW_n$, where DS is the disruption score, P is the pod number, W is the weight assigned to the pod based on the disruption policies, As noted above, the disruption score may indicate how disruptive moving a particular pod and/or service is for the system.

At 408, the system may determine whether the list contains another pod. If so (408-YES), the method returns to 404 and the system determines a disruption score for the other pod(s) in the list 318.

Where the system determines there is not another pod in the list of pod(s) 316 (408-NO), the method proceeds to 410. At 410, the system may, normalize the disruption score(s) for the pod(s). For instance, as noted above, the disruption score(s) may be normalized between 0 and 100, where 0 indicates no service disruption and 100 indicates the most service disruption. For example, a cluster may include Pod A and Pod B. In some examples, Pod A may perform monitoring services for the system and Pod B may be responsible for providing UI/UX administrative services to an end user. In this example, moving Pod B would result in a greater impact on the system (e.g., a greater service disruption) compared to Pod A, as the end user may be interacting with Pod B. Accordingly, in this example, Pod A may have a lower disruption score compared to Pod B.

At 412, the system may sort the disruptions score( ) For instance, the disruption de-scheduler module 314 may sort the list of the pod(s) 316 from least disruptive (e.g., scores closer to 0) to most disruptive (scores closer to 100) based on the disruption score(s) associated with each pod. For instance, in the example of Pod A and Pod B described above, Pod B may be placed below Pod A in the sorted list (as Pod B has a higher disruption score).

At 414, the system may select a subset of pods) from the sorted list to de-schedule. As noted above, the subset of the sorted list may be based at least in part on a balancer policy received from the policy manager 112. For instance, the selected subset of pod(s) may comprise pod(s) from the list of pods 316 that have the lowest disruption scores. Accordingly, the system may select a subset of the pods flagged as violating compute usage that will result in the least disruption to move to help restore or realign compute resources in the system.

In some examples, the system and/or disruption de-scheduler module 314 may send instructions to one or more pods associated with the selected subset, where the instructions cause each pod in the subset to restart, thereby enabling the services) to be re-distributed within the cluster.

In some examples, the system may determine from the selected subset, an overall disruption impact of the operation to restore compute balance in the system. For instance, the system may, based on the overall impact, output a notification to an end user device 120 to warn the user of the move operation associated with restoring resource balance. In some examples, the system may comprise a configuration setting to determine if operation can happen automatically based on a customer risk tolerance set by the end user.

Figure 5:
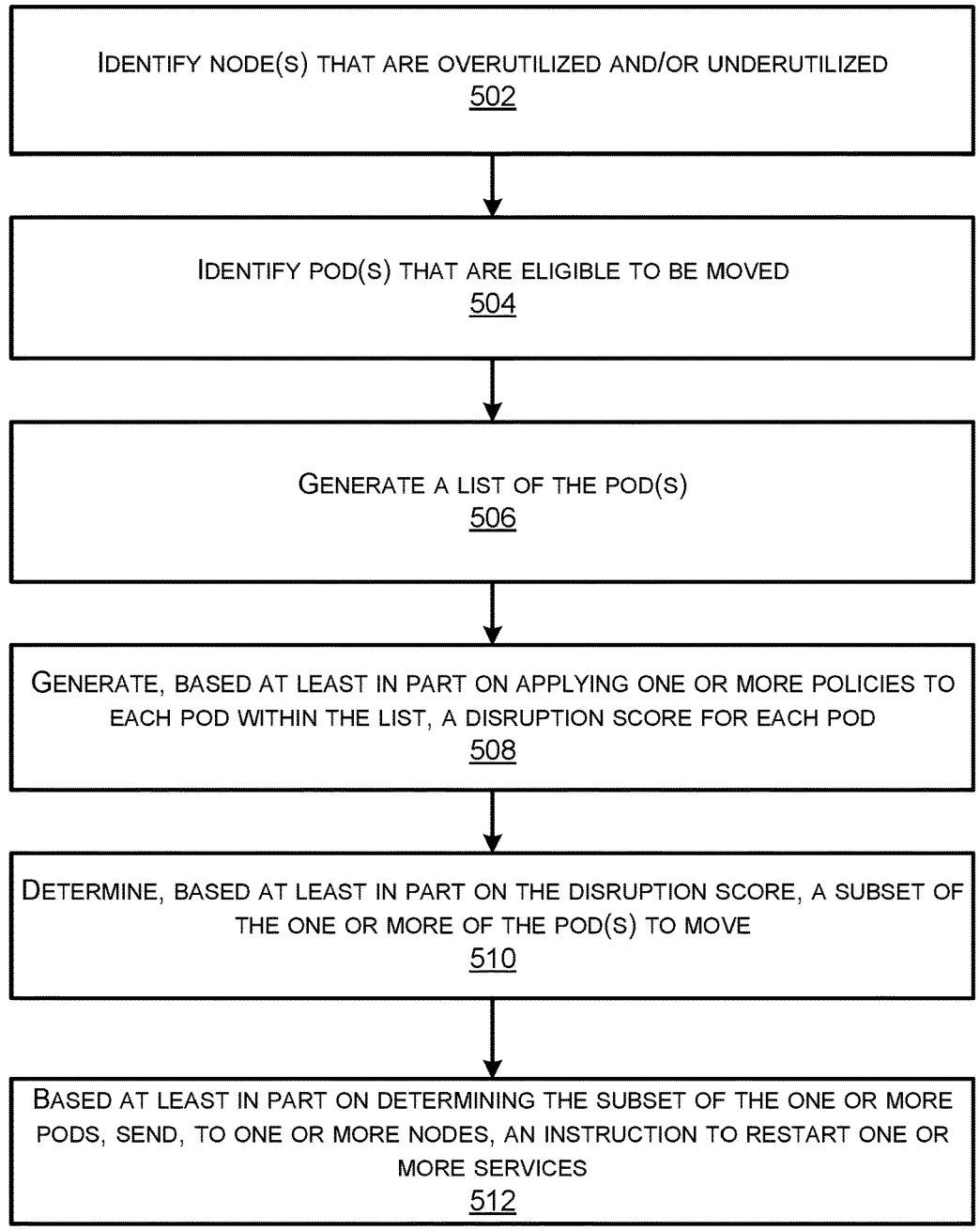
FIG. 5 illustrates a flow diagram of an example method for de-scheduling pods within a system.

FIG. 5 illustrates a flow diagram of an example system 500 for de-scheduling pods within a system, In some instances, the steps of system 500 may be performed by a device (e.g., master node 106, node 108, etc.) that includes one or more processors and one or more non-transitory computer-readable media storing computer-executable instructions that, when executed by the one or more processors, cause the one or more processors to perform operations of system 500, At 502, the system may identify node(s) that are over utilized and/or underutilized. For instance, the system may identify the node(s) using the placement manager module 110 described above. As described above, identifying the node(s) may be based at least in part on monitoring, by a central node, the one or more nodes within the cluster. For instance, the nodes may be monitored by the health manager, as described above.

At 504, the system may identify pod(s) that are eligible to be moved. For instance, the pod(s) eligible to be moved may be identified based at least in part on a de-scheduler (e.g., such as de-scheduler 312) and/or a violation detection module 310, as described above.

At 506, the system may generate a list of pod(s). For instance, as described above, the violation detection module 310 may generate the list of pod(s). In some examples, the list of pod(s) corresponds to the list of pod(s) 316 (also referred to as "list of candidate pods"), At 508, the system may generate, based at least in part on applying one or more policies to each pod within the list, a disruption score for each pod. In some examples, the one or more disruption scores are based at least in part on one or more disruption policies, one or more service level agreement policies, one or more characteristics associated with each pod, and/or one or more metrics associated with each pod.

At 510, the system may determine; based at least in part on the disruption score, a subset of the one or more of the pod(s) to move. In some examples, the system may further comprise determining one or more normalized disruption scores, the one or more normalized disruption scores indicating a level of impact on a network associated with moving a service associated with a pod. In some examples, the subset of the one or more pods to move is determined based at least in part on the one or more normalized disruption scores.

At 512, the system may, based at least in part on determining the subset of the one or more pod(s), send to one or more nodes, an instruction to restart one or more services.

Figure 6:
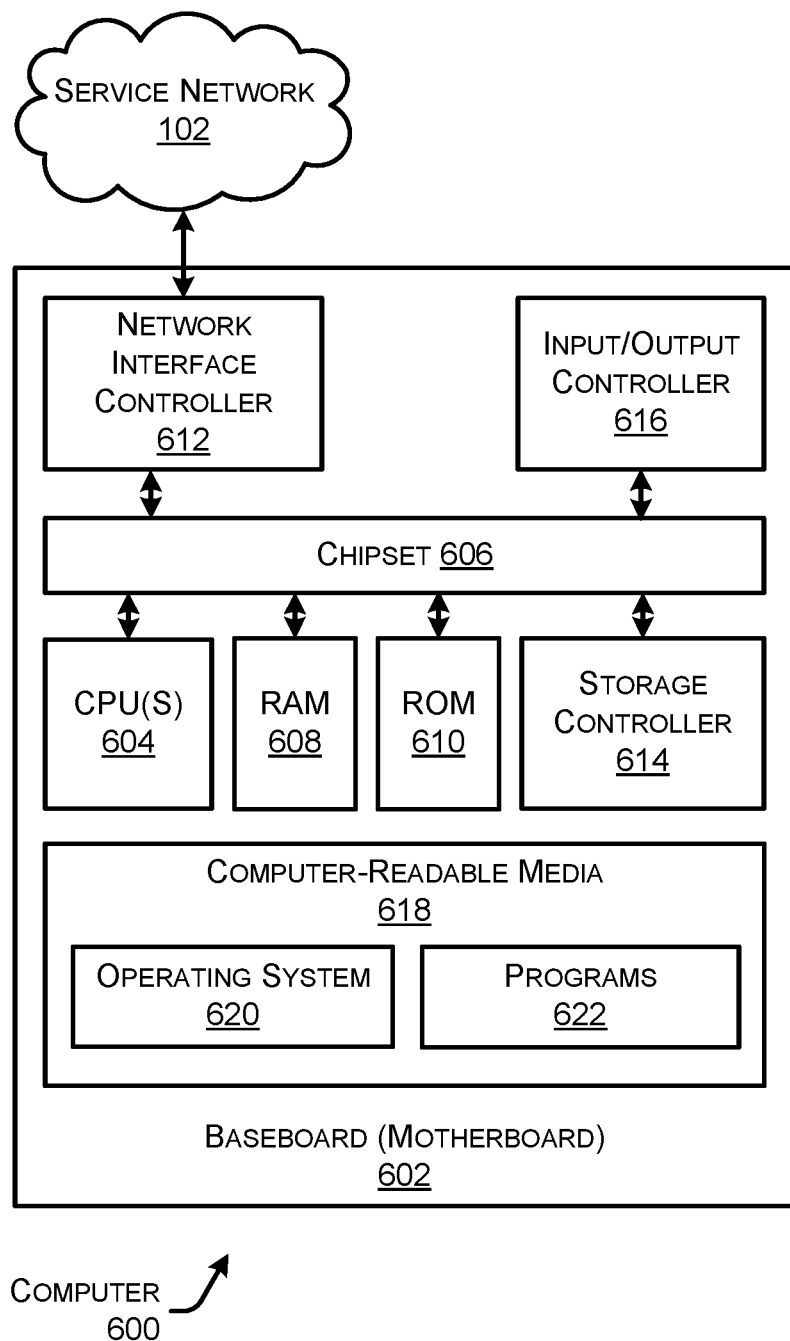
FIG. 6 is a computer architecture diagram showing an illustrative computer hardware architecture for implementing a device that can be utilized to implement aspects of the various technologies presented herein.

FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer may, in some examples, correspond to a master node 108, a node 106, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths, In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as service network 102. The chipset 606 can include functionality for providing network connectivity through a NIC 612, such as a gigabit Ethernet adapter. The NIC 612 is capable of connecting the computer 600 to other computing devices over the service network 102. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

in addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the master node 108, the node 106, and/or any components included therein, may be supported by one or more devices similar to computer 600. Stated otherwise, some or all of the operations performed by the master node 108, the node 106, and/or any components included therein, may be performed by one or more computer devices 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device, It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a master node 108, a node 106, and/or any other device. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the master node 108, the node 106, and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for providing an intelligent de-scheduler filtering system that minimizes service disruptions within a network. For instance, the programs 622 may cause the computer 600 to perform techniques, including: identifying one or more nodes within a cluster of nodes with resources that are at least one of underutilized or overutilized; identifying one or more pods associated with the cluster of nodes that are eligible to be moved; generating a list comprising the one or more pods; generating one or more disruption scores for the one or more pods; determining, based at least in part on the one or more disruption scores, a subset of the one or more pods to move; and sending, to at least one of the one or more nodes within the cluster of nodes, an instruction to restart one or more services associated with the subset of the one or more pods.

In this way, the system can provide continuous monitoring of clusters and resource usage within a dynamic system. Further, by utilizing configurable disruption policies, balancer policies, service level agreement policies, and other data associated with the cluster and/or pods, the techniques intelligently determine a subset of pod(s) within a cluster to move. Moreover, by selecting a subset of pods that are flagged as violating compute usage to be selected to be moved, the techniques result in improved user experience by minimizing service disruption to move to help restore or realign compute resources in the system.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   identifying a node within a cluster of nodes with resources that are at least one of underutilized or overutilized;
   identifying pods associated with the cluster of nodes that are eligible to be moved, each of the pods running respective virtual containers and supporting a single service;
   generating disruption scores for the pods, each of the disruption scores indicating a measure of disruption caused to the service based on the respective pod being moved;
   selecting, based at least in part on a comparison of the disruption scores, a pod from the pods having a low disruptive score relative to the disruption scores;
   determining to move the pod based at least in part on the pod having the low disruptive score relative to the disruption scores of the pods; and
   sending, to at least one of the cluster of nodes, an instruction to move the pod having the low disruptive score.

2. The method of claim 1, wherein identifying the node is based at least in part on monitoring, by a central node, the node within the cluster.

3. The method of claim 1, wherein the disruption scores are based at least in part on a disruption policy.

4. The method of claim 3, wherein the disruption scores are further based at least in part on a service level agreement policy.

5. The method of claim 1, wherein the pods are identified based at least in part on a balancer policy.

6. The method of claim 1, wherein the disruption scores are further based at least in part on a characteristic associated with each pod or a metric associated with each pod.

7. The method of claim 1, further comprising:
   determining a normalized disruption score, the normalized disruption score indicating a level of impact on a network associated with moving the service associated with a pod; and
   determining, based at least in part on the normalized disruption score, the pod to move.

8. A system comprising:
   one or more processors; and
   one or more non-transitory computer-readable media storing computer-executable instructions that, when executed by the one or more processors, cause the one or more processors to perform operations comprising:
      identifying one or more a node within a cluster of nodes with resources that are at least one of underutilized or overutilized;

identifying pods associated with the cluster of nodes that are eligible to be moved, each of the pods running respective virtual containers and supporting a service;

generating disruption scores for the pods, each of the disruption scores indicating a measure of disruption caused to the service based on the respective pod being moved;

selecting, based at least in part on a comparison of the disruption scores, a pod from the pods having a low disruptive score relative to the disruption scores;

determining to move the pod based at least in part on the pod having the low disruptive score relative to the disruption scores of the pods; and sending, to at least one of the cluster of nodes, an instruction to move the pod having the low disruptive score.

9. The system of claim 8, wherein identifying the node is based at least in part on monitoring, by a central node, the node within the cluster.

10. The system of claim 8, wherein the disruption scores are based at least in part on a disruption policy.

11. The system of claim 10, wherein the disruption scores are further based at least in part on a service legal agreement policy.

12. The system of claim 8, wherein the pods are identified based at least in part on a balancer policy.

13. The system of claim 8 wherein the disruption scores are further based at least in part on a characteristic associated with each pod or a metric associated with each pod.

14. The system of claim 8, the operations further comprising:

determining a normalized disruption score, the normalized disruption score indicating a level of impact on a network associated with moving the service associated with a pod; and determining, based at least in part on the normalized disruption score, the pod to move.

15. One or more non-transitory computer-readable media storing instructions that, when executed by one or more processors, cause the one or more processors to perform operations comprising:

identifying a node within a cluster of nodes with resources that are at least one of underutilized or overutilized;

identifying pods associated with the cluster of nodes that are eligible to be moved, each of the pods running respective virtual containers and supporting a service;

generating disruption scores for the pods, each of the disruption scores indicating a measure of disruption caused to the service based on the respective pod being moved;

selecting, based at least in part on a comparison of the disruption scores, a pod from the pods having a low disruptive score relative to the disruption scores;

determining to move the pod based at least in part on the pod having the low disruptive score relative to the disruption scores; and sending, to at least one of the cluster of nodes, an instruction to move the pod having the low disruptive score.

16. The one or more non-transitory computer-readable media as claim 15 recites, wherein identifying the node is based at least in part on monitoring, by a central node, the node within the cluster.

17. The one or more non-transitory computer-readable media as claim 15 recites, wherein the pods are identified based at least in part on a balancer policy.

18. The one or more non-transitory computer-readable media as claim 15 recites, wherein the disruption scores are based at least in part on a disruption policy.

19. The one or more non-transitory computer-readable media as claim 18 recites, wherein the disruption scores are further based at least in part on (i) a characteristic associated with each pod, (ii) a metric associated with each pod, or (iii) a balancer policy.

20. The one or more non-transitory computer-readable media as claim 15 recites, the operations further comprising:

determining a normalized disruption score, the normalized disruption score indicating a level of impact on a network associated with moving the service associated with a pod; and determining, based at least in part on the normalized disruption score, the pod to move.

* * * * *